United States Patent [19]

Washkewicz et al.

[11] Patent Number: 4,952,262
[45] Date of Patent: Aug. 28, 1990

[54] HOSE CONSTRUCTION

[75] Inventors: Donald E. Washkewicz, Aurora; Harold Belofsky, Ravenna, both of Ohio

[73] Assignee: Parker Hannifin Corporation, Cleveland, Ohio

[21] Appl. No.: 268,589

[22] Filed: Nov. 8, 1988

Related U.S. Application Data

[63] Continuation of Ser. No. 859,552, Mar. 5, 1986, abandoned.

[51] Int. Cl.$^5$ ............................................. B32B 31/00
[52] U.S. Cl. ................................ 156/149; 156/272.4; 156/273.9
[58] Field of Search ................. 156/149, 273.9, 274.2, 156/272.4, 244.12, 244.13; 138/125, 132, 144

[56] References Cited

U.S. PATENT DOCUMENTS

| | | | |
|---|---|---|---|
| 3,633,629 | 1/1972 | Rider | 138/127 |
| 3,790,419 | 2/1974 | Atwell et al. | 156/149 |
| 3,944,453 | 3/1976 | Chudgar et al. | 156/143 |
| 3,945,867 | 3/1976 | Heller, Jr. et al. | 156/143 |
| 4,029,837 | 6/1977 | Leatherman | 428/247 |
| 4,104,095 | 8/1978 | Shaw | 156/83 |
| 4,302,266 | 11/1981 | Kutnyak | 156/149 |
| 4,303,457 | 12/1981 | Johansen et al. | 156/149 |
| 4,341,578 | 7/1982 | Chermak et al. | 156/149 |
| 4,384,595 | 5/1983 | Washkewicz et al. | 138/127 |
| 4,420,018 | 12/1983 | Brown, Jr. | 138/124 |

FOREIGN PATENT DOCUMENTS

| | | | |
|---|---|---|---|
| 2812916 | 9/1978 | Fed. Rep. of Germany . | |
| 45-85523 | 7/1970 | Japan | 156/274.2 |

Primary Examiner—David Simmons
Attorney, Agent, or Firm—Renner, Otto, Boisselle & Sklar

[57] ABSTRACT

A method of hose construction and product formed thereby consisting of an extruded thermoplastic core tube having ferrometallic wire reinforcement windings thereon which are closely wound and providing minute spaces between the wires. The reinforced core tube structure is elevated in temperature by an induction heater which concentrates heating in the wire reinforcement and transfers heat from the wire by conduction to the outer periphery of the core tube. Supplemental conventional heaters may be used in conjunction therewith to achieve substantial temperature elevation of the wire reinforcement. Thereafter a thermoplastic cover is pressure extruded over the heated wire reinforcement and forced through the minute spaces in the reinforcement into engagement with the core tube periphery. Cool-down establishes a bond between cover, wires and core tube and a mechanically locked, integral composite hose structure.

24 Claims, 2 Drawing Sheets

HOSE CONSTRUCTION

BACKGROUND OF THE INVENTION

This invention relates to a method for producing hose, and more particularly, to a hydraulic hose embodying metallic reinforcement layers and thermoplastic core tube and cover layers. Hoses formed of thermoplastic materials have become commonplace due to the advantages in being relatively light weight and having relatively small dimensions. One of the problems encountered with such hose, however, is maintaining the integrity of the hose which requires that reliable, long lasting adhesive bonds are established between the layers of such hoses.

A further advantage of thermoplastic hoses is that thermoplastic materials such as nylons, urethanes and co-polyesters can be used which inherently possess excellent chemical resistance to a wide variety of solvents, oils, fuels and other chemicals. This advantage, however, also poses a challenge to the hose manufacturer, in that the excellent chemical resistance of these thermoplastics makes it difficult to obtain adhesives which will chemically bond to the relatively inert surfaces of the core tube and cover of the hose. In addition, the typical textile fiber reinforcements of these hoses, such as polyester, nylon or aramid yarns are also relatively inert and hard to bond. To solve these problems, hose manufacturers have found various adhesive chemicals, particularly, urethane adhesives to use for thermoplastic hoses that are textile yarn reinforced. However, until now, there has been no reliable method for adhesively bonding a thermoplastic hose where the main reinforcement is steel wire. The primary object of this invention is to produce a thermoplastic hose construction wherein the thermoplastic cover is mechanically interlocked and thereby bonded with the steel wire reinforcement which may be brass plated steel wire, stainless steel wire or any other ferrometallic material capable of being induction heated. The secondary object is to provide a controlled degree of combined mechanical and chemical bonding between the cover and the core tube material.

An example of prior art in the construction of steel wire reinforced thermoplastic hose is in U.S. Pat. No. 4,341,578 of Chermak et al, who teaches the localized heating of the braided wire layer by an induction heating process. In the Chermak patent, the induction heating of the wire braid is performed during the braiding process and causes localized generation of heat in the steel wire which is conducted to the outer surface of the thermoplastic core tube. As a result, thermal expansion of the core tube is achieved, which results in protrusion of core tube material through interstices and small openings in the wire braid. It is taught that these protrusions can be thermally fused to a compatible thermoplastic cover material in a subsequent cover crosshead extrusion process. The disadvantages of this procedure as an optimum means of hose construction are important and are as follows:

Cover material is chosen for maximum flexibility and abrasion and wear resistance. Typical cover materials such as polyurethanes have flexural moduli of 7000 PSI compared to nylon or co-polyester core tube materials with flexural moduli of 30000 to 50000 PSI. Other cover materials are thermoplastic elastomers such as Santoprene, which is a trademark for such material produced by Monsanto Industrial Chemicals Co. The cover is thus much more flexible than the core tube material. Optimally, core tube material is chosen for toughness, chemical resistance and high tensile strength. Typical core tube materials are Hytrel, which is a trademark for a DuPont Co. thermoplastic co-polyester and nylon. With core tube material chosen to be less flexible than cover material, it is furthermore stiffened when it is mechanically oriented by flow through small reinforcement openings. Thus, the construction described by Chermak will tend to stiffen the hose excessively by interlocking high tensile strength and high flexural moduli material between the braided strands and reducing the mobility of the wires accordingly. This will disadvantageously affect the flexibility and service life of the hose, particularly when the hose is subjected to pulsating pressures in service. This effect is increased because of the reduction in average core tube thickness due to the loss of material that expands outward through the reinforcement.

The cover in Chermak is extruded over a wire braid and is supposed to fuse with the core tube protrusions. If the core tube is nylon or co-polyester, however, and the cover is urethane, then the tube and cover materials will not physically wet each other sufficiently to bond unless the cover extrusion is at an impractical high temperature sufficient to melt the core tube surface to achieve mutual fusion. For example, the melt point of Hytrel 5556, a commonly used core tube material is about 412° F., while the typical urethane extrusion temperature is less than 375° F. Clearly, the urethane will not thermally fuse with the Hytrel in this process. Further, even if the melt temperatures were closer together, the economical line speed for cover extrusion is so fast that the tube protrusions could not be heated sufficiently to soften or melt before the cover was quenched in the cooling tank just downstream of the crosshead extrusion die.

Relative to investment economy, it is noted that one cover extrusion line has the capacity to match 5 to 8 braiders in hose throughput. This means that in the case of the Chermak process, 5 to 8 induction heaters, an expensive equipment item, might have to be provided, one at each braider line to match the capacity of one extruder line. The alternative is an extra "off-line" process just to induction heat the wire braid as described by Chermak which would also be a greater operating cost than that required in the present invention.

Another disadvantage of the prior art process has to do with the so-called "hybrid" hose constructions in which there is an inner textile braid and an outer steel wire braid. Such a hose construction is described in U.S. Pat. No. 4,384,595 of Washkewicz et al. It is not desirable in this construction to cause tube protrusion through the inner braid as it would interfere with yarn mobility and prevent stress transfer from the inner to the outer braid. All of these objections are overcome in the present invention as will be made clear hereinafter.

SUMMARY OF THE INVENTION

In one embodiment, the hose of this invention comprises a thermoplastic core tube, a steel wire braid for reinforcement and a thermoplastic cover. In another version, the reinforcement is an inner braid of textile yarn such as polyester, nylon or aramid fiber, and an outer braid of steel wire and a thermoplastic cover. In another version there is an inner steel wire braid, a thin thermoplastic interlayer, an outer steel wire braid and a thermoplastic cover. In other related constructions, the steel wire braid or braids are replaced by spiral windings of steel wire. One feature common to all these constructions is that there are small spaces or openings between the wires as a result of both design and the process of braiding. As the wire reinforcement is wound over the core tube under tension the adjacent wires are drawn into tight engagement with the core tube and are placed closely adjacent one another leaving these minute spaces adjacent the overlapping wires. Such reinforced core tube is directed to a crosshead extruder line wherein a heater stage raises the temperature of the reinforcement wire. Such heating is preferentially done by induction heating, but may be supplemented by other types of heaters such as radiant infrared or open gas flame. The induction heater capacity is sufficient to heat the mass of wire to a temperature higher than the normal extrusion temperature of the cover. By conduction, some of this thermal energy will heat and slightly soften the outer periphery of the core tube or any other layer under the outer wire reinforcement. Since thermoplastics are relatively poor thermal conductors the bulk of the core tube will be unaffected by the wire heating. Immediately after the induction heating unit, the reinforced core tube passes through a typical crosshead extruder for pressurized application of the thermoplastic cover. This extrusion process forces the cover, which is preferably more flexible than the tube material, through the small spaces between wires and into contact with the underlying core tube or other layer. The higher the temperature of the wire surfaces, as a result of the induction heating, the greater will be the flow of cover material between the spaces in the wire reinforcement and the more likely that thermal fusion and mechanical interlocking will occur between cover and core tube and cover and wire respectively. According to conventional practice, a water cooling tank immediately follows the crosshead and the covered hose outer surface is quenched within a second or two of leaving the extruder. The rapid cooling of the outer surface of the cover, shrinks the cover onto the wire reinforcement and locks the structure together permanently. By this technique, there will be considerable mechanical interlocking of cover with wire, and, depending on the adjustment of the heater, there will be some adhesive contact between cover and core tube materials.

Where a hose contains more than one layer of reinforcement it may be undesirable or difficult to obtain core tube expansion through to the cover area as in the prior art. In this case, the very high temperature achieved by induction heating of the wire surface produces excellent fusion and interlocking of cover and wire without need for cover to tube contact.

The process of this invention has the possibility of excellent control of the significant parameters. Infrared preheat power, induction heater power, distance between induction heater stage and crosshead extruder, and crosshead die temperature can all be varied relative to cover extrusion line speed so that the wire temperature and core tube temperature are, in effect, individually controllable. Thus, the degree of cover penetration can be maximized while keeping the degree of core tube protrusion to a minimum if desired.

Previous art such as Chermak, et al requires high internal air pressure during heating to force softened tube through the reinforcement from inside and to prevent pinholes in the tube. In this invention, the main penetration is of cover into the braid from outside so that internal air pressure during extrusion need not be as high or as critical and there is no danger of tube pinholes created by excessive tube heating. By performing the induction heating in line with cover extrusion and controlling induction generator power and line speed, very high wire temperatures are obtained without unduly heating the core tube. This greatly enhances the wettability of the wire surface and the flow of cover material into the reinforcement thereby providing optimum adhesion.

THE EFFECTS OF WIRE TEMPERATURE ON ADHESION

In order to clarify the advantages of the present invention, the process may be considered in more detail at this point. First, the preheater stage will act to vaporize a substantial part of the absorbed oils and moisture on the wire surface which would otherwise reduce adhesion. The preheater also provides some elevation of the wire temperature which will reduce the power needed for the following induction heating stage. The induction heater rapidly raises wire temperature and vaporizes most of the remaining surface contaminants on the wire. The heating effect can be powerful enough to cause controlled embedment of the core tube in the wire interstices if desired. Also, these protrusions will be at an elevated temperature entering the crosshead extruder. It is most important to limit the core tube protrusion effect, as previously explained, and to obtain the cover adhesion and hose integrity primarily by directed flow of the softer, more flexible cover material. Finally, the heated hose structure reaches the crosshead die area where the wire temperature is sufficient to create a thin layer of low viscosity cover material. The nature of the extrusion process is that the flow through the die in a covering operation consists of two parts: drag flow and pressure flow. The drag flow is due to a relative velocity difference between faster moving hose and slower moving extrudate. Obviously, the low viscosity layer created by the high temperature wire surface will act as a thin, molten adhesive layer which is forced by the crosshead vacuum to fill up any small spaces between wires. At the die exit, the higher viscosity extrudate in the bulk of the flow channel and under elevated pressure will force the thin adhesive layer further into the wire spaces. As soon as the exiting covered hose is quench-cooled in the downstream cooling tank, the outer surface of the cover contracts and the structure is locked into position.

DETAILED OF THE INVENTION

Figure 1:
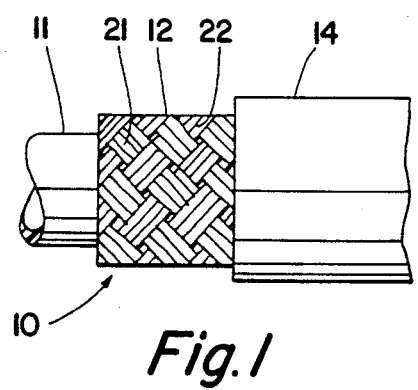
FIG. 1 is a cutaway view of a single wire braid hose of the invention.
Figure 6:
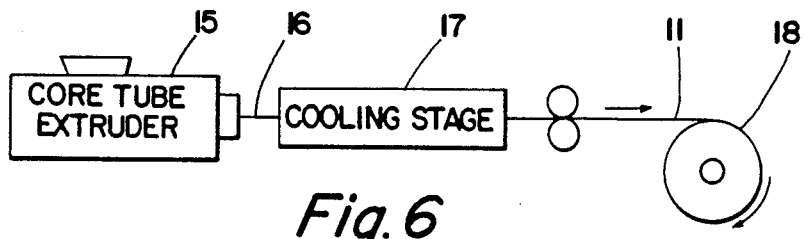
FIGS. 6, 7 and 8 are schematic diagrams showing the process of this invention.
Figure 7:
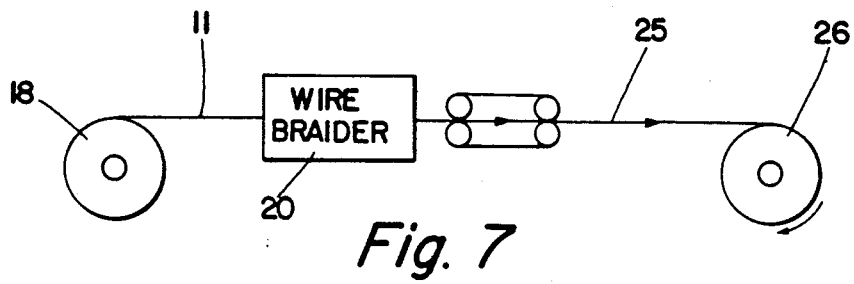
Figure 8:
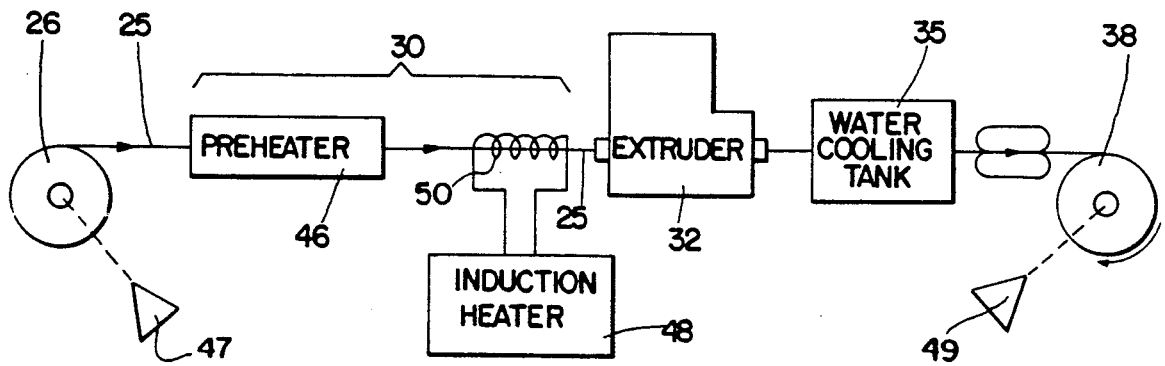

Referring initially to FIG. 1, the hose 10 depicted comprises core tube 11, braided wire reinforcement layer 12 and outer cover 14. Construction of hose 10 by the method of the present invention is illustrated in FIGS. 6–8, wherein core tube 11 is obtained from a conventional extruder 15 in a manner well understood in the art. As seen in FIG. 7, core tube 11 is let off from storage reel 18 and delivered to a braider or winding stage 20 for application of the reinforcement 12 to the core tube 11 in a predetermined pattern. As noted, the pattern may be a conventional spiral winding of the hose structure, wherein a first reinforcement wire is wound in one direction over the core tube and the second layer of reinforcement wire is wound in an opposite direction over the first layer of winding, but preferably the reinforcement layer 12 is applied as an interwoven braid of the reinforcement wires 21, 22 in a manner well understood in the art. The reinforced core tube structure 25 is then wound on a storage drum 26 for further processing.

In FIG. 8, the same storage drum 26 is depicted for payoff of material. The now reinforced core tube structure 25 is directed to a heater zone 30 for elevation of temperature of the reinforcement wire 12 as well as the outer periphery of core tube 11 and the structure 25 is immediately passed through a cover extruder 32 for application of the cover 14. Thereafter, the composite structure is passed to a cooling stage 35 and eventually to hose windup reel 38.

Figure 4:
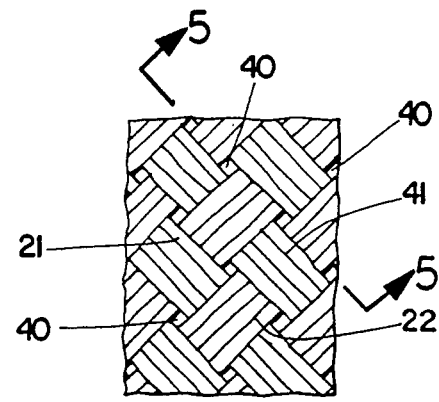
FIG. 4 is an enlarged overview of a typical wire braid reinforcement surface, showing in detail the spaces between wire strands and the interstices where the wire strands cross over each other.

As seen more clearly in FIG. 4, the reinforcement wires 21, 22 comprise a braid of alternately interwoven wires wound in opposite directions about core tube 11 in a typical over and under pattern. Each of the reinforcement wires 21, 22 may comprise one or more wire ends as depicted, the wire ends in each strand being laid closely adjacent one another in a side by side or overlapping relationship and the crossing wires drawn tightly into engagement with one another. Even though the braid thus achieved is relatively close or tight, small spaces 40 will occur at the intersections of the adjacent reinforcement wires 21, 22 through which the core tube 11 is exposed. Further spaces 41 will occur as well between adjacent ends in each strand 21, 22 even as the strands are overlapped and all of these spaces or interstices 40, 41 serve as locations for permeation by cover 14, for interlocking of the hose structure. This relationship is seen more clearly in the enlarged fragmentary view of FIG. 5, wherein just one intersection of reinforcement wires 21, 22 is depicted in relation to the core tube 11 and cover 14. In this showing, spaces 41 between adjacent ends of strand 21 appear to be substantially closed, but this is dependent upon the lay and spacing of the ends, and the like, and in most instances results in a significant opening.

Figure 5:
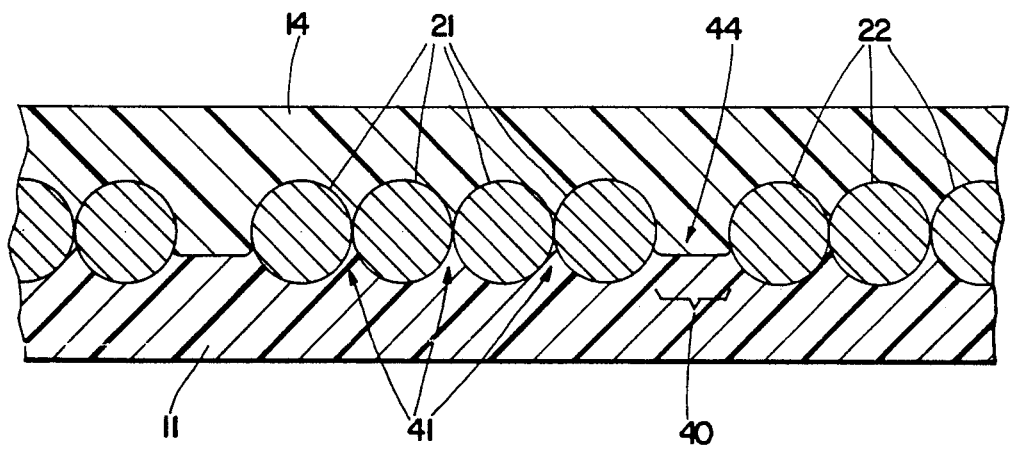
FIG. 5 is an enlarged cross section view, through plane 5—5 of FIG. 4 of the hose of FIG. 1, showing cover penetration.

In the enlarged fragmentary view of FIG. 5, the space between adjacent reinforcement wires 21, 22 is seen more clearly as the area enclosed by the bracket identified by numeral 40. As initial heating of the reinforcement wires 21, 22 occurs and as heat is transmitted to the periphery of core tube 11 a partial embedment of the reinforcement wires 21, 22 into the surface of core tube 11 takes place due to the thermal expansion of the core tube. This embedment increases the mechanical bond between the reinforcement wires and the core tube 11. As the cover 14 is extruded over the thus reinforced core tube structure 25, the minute spaces 41 between adjacent wire strands 21 or 22 are filled as well as the spaces 40 between the crossing reinforcement wires 21, 22 as depicted by the projection 44. Cover projection 44 extends substantially the full depth of reinforcement wires 21, 22 into engagement with the exterior surface of core tube 11 and due to the elevated temperature thereof causes a localized further heating of core tube 11 and an intermixing of the surfaces therebetween. Cross head extruder 32 provides a pressure extrusion of the cover 14 onto the reinforced core tube structure 25 which not only provides the final outside diameter of the hose structure 10, but also forces the material of the cover 14 into the spaces and interstices of the hose structure.

The heater stage 30 is depicted in FIG. 8 as comprising an initial heater or preheater 46 and induction heater 48. Many variations are possible for the heater zone, however, it is preferable to include the induction heater 48 as an essential element of such heater stage inasmuch as a preferred heating characteristic is achieved thereby since the induction method heats steel wire directly but plastic only indirectly. The initial heater 46 may comprise a radiant heater, an open-flame arrangement or conventional convection type heater or similar device as the primary purpose is to elevate the temperature of the steel wires 21, 22 from an ambient temperature condition whereby, the final heating process can be substantially completed in the induction heater 48. However, preheater 46 is not mandatory and the entire heating process can be achieved by induction heater 48, in conjunction with that heat derived from crosshead extruder 32.

The advantages of the induction heater 48 include the fact that the heating effect can be achieved at a particular desired location and that a great amount of heat can be applied to a rapidly moving extrusion line. Further, induction heat is a relatively safe process requiring only electrical energy and the establishment of a magnetic field through which the reinforced core tube structure 25 is passed. Regarding the localization of the heating effect, only the reinforcement wires 21, 22 are influenced by the magnetic field of the induction heater 48. The localized heating primarily raises the temperature of the reinforcement layer 12 but also heats by conduction the adjacent periphery of core tube 11. Induction heater 48 comprises a high frequency electrical generator coupled to an induction heater coil 50 which is typically one or more turns of copper tubing wound in the form of a helical coil and through which the reinforced core tube structure 25 is passed in a manner known in the art. The energy supplied by induction heater 48 must be considerable in order to elevate the temperature of the reinforcement wires 21, 22 to the proper level. Although heat may be applied solely by an induction heater 48 having a relatively high capacity, it may be advantageous as well to supply additional heat energy by means of the initial heater stage 46. This preheater also vaporizes most of the residual wire lubricant left on the wire during braiding so that this is not carbonized in the induction heater stage.

The resulting product is a hose 10 having an integrated structure, wherein the cover 14, core tube 11 and reinforcement wires 21, 22 are mechanically locked together by means of the localized grips provided by the plurality of projections occurring at each of the spaces 40, 41 such as the projections 44. Such integrated structure is advantageous in maintaining the integrity of the hose 10 and provides superior fatigue and flexibility characteristics when joined with a coupling in a typical hydraulic power system.

Further, the reinforced core tube structure 25 depicted in FIG. 8 may be supported internally in various manners known in the art. If required, it is possible to support the interior thereof by means of air under pressure supplied through suitable coupling unions as depicted schematically at 47,49. This process would include the prior formation of a reinforced core tube structure 25 as supplied from a storage reel or the like and which is then supplied to the heater zone 30 and subsequent cover extruder 32 in the manner described previously. In such an air support arrangement, the inner surface of the core tube 11 may be maintained at a relatively low temperature level and, thereby, not be influenced by the heat energy supplied at the heater zone 30, limiting the heating effect to the outer periphery of the core tube 11 and not affecting the interior sizing. It is apparent then that in this arrangement, possibly even greater heat is required of the heater zone 30 to elevate the temperature of the reinforced core tube structure 25 to a level at which proper bondment between cover 14 and core tube 11 occurs. Quick cooling in stage 35 by water quenching of the hose immediately after the crosshead extruder 32 provides shrinkage forces to enhance and maintain the bond formed in the extrusion die until the entire structure has cooled. This process can also be aided by the internal air pressure maintained during the entire operation.

Figure 2:
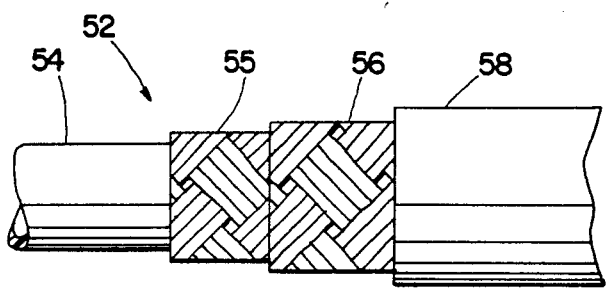
FIG. 2 is a cutaway view of a hybrid hose of the invention with a textile inner braid and a wire outer braid.

Referring to FIG. 2, another example of hose 52 suitable for use in practicing of the invention is shown as comprising thermoplastic core tube 54, first reinforcement layer 55, second reinforcement layer 56, and thermoplastic cover 58. First reinforcement layer 55 is a textile braid wound in a conventional pattern which leaves openings between the adjacent windings similar to the openings 40, 41 previously described with respect to the embodiment of FIG. 1. Second reinforcement 56 is a wire braid also with similar openings which provide a path for extrusion of the cover 58 into bonding engagement with core tube 54 in the manner previously described. In this embodiment however, passage of the second reinforcement through an induction heater zone provides less of an effect upon core tube 54 due to the intervening first reinforcement structure 55. However, a similar result obtains, so that bondment occurs between cover 58 and core tube 54 as well as the mechanical encapsulation of the second reinforcement 56 wires. In the case where the inner layer 55 is essentially 100% coverage, the net result will be an interlocked cover, wire layer without tube to cover contact. In this case, (referring to example in FIG. 2 where inner textile braid is essentially 100% coverage) the inner textile braid may be adhesively bonded to the core tube by a chemical adhesive such as a moisture-curing polyurethane.

Figure 3:
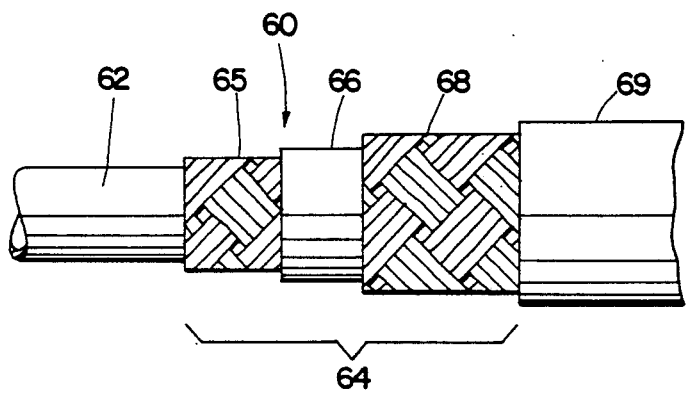
FIG. 3 is a cutaway view of a two wire braid hose of the invention with the braids separated by a thin thermoplastic layer.

Yet another embodiment of hose 60 is depicted in FIG. 3. Here thermoplastic core tube 62 is covered with reinforcement 64 comprising individual layers of a first wire or textile reinforcement, interlayer 66 and second wire braid 68. The structure is jacketed with a thermoplastic cover 69 by a pressure extrusion technique so that spaces throughout reinforcement 64 are filled by either layer 66 or cover 69, and bonding contact achieved with core tube 62. A similar heating of the reinforced core tube by induction heating means or combined induction heating and other heating devices achieves a hose condition particularly suited for movement of the cover 69 and interlayer material 66 throughout reinforcement 64 and into engagement with core tube 62, as well as the mechanical interlock achieved with the second reinforcement layer 68. Interlayer 66 may be a material commonly used for separation of adjacent reinforcement layers and in this invention will be selected for compatibility in bonding to either the core tube or cover as well as its abrasion resistant characteristics. This applies to many different thermoplastic materials. Further, an interlayer such as 66 could be used in a construction wherein first reinforcement 65 comprises a first textile braid, in either an open or one hundred per cent coverage weave, covered in turn by a wire reinforcement layer or by an inner layer and a wire reinforcement layer, with the remainder of the structure covered by interlayer 66, outer wire braid 68 and cover 69.

We claim:

1. The method of forming reinforced thermoplastic hose comprising the steps of extruding a thermoplastic core tube of continuous extended length, winding one or more layers of reinforcement over said core tube in closely spaced windings to form a reinforced core tube wherein the outer reinforcement winding material is ferrometallic wires having minute spaces between said wires, heating said outer wire windings by passing said reinforced core tube through heater apparatus while controlling such heating to limit extrusion of core tube material into said spaces between said wires to less than one-half the thickness of said outer reinforcement winding material, immediately thereafter, at elevated temperature, pressure extruding thermoplastic cover material over said reinforced core tube and through said spaces of said heated reinforcement wire to form a composite hose structure, said cover material being extruded through said spaces to a depth exceeding the depth of any penetration of core tube material into said spaces, and cooling said composite hose structure to bond said cover material to said reinforcement wires to form an interlocking, integrated hose structure.

2. The method set forth in claim 1 wherein said heater apparatus comprises an induction heater located closely adjacent said pressure extruder.

3. The method set forth in claim 1 wherein said heater apparatus further comprises a preheater in front of said induction heater.

4. The method set forth in claim 1 wherein said core tube is internally supported during said winding, heating and pressure extruding steps.

5. The method set forth in claim 1 wherein said cooling step comprises quenching said composite structure in water.

6. The method set forth in claim 1 wherein said cooling step also comprises passing cool fluid through said core tube to substantially maintain the integrity of said core tube and confine bonding to the peripheral surface thereof.

7. The method set forth in claim 1 wherein said winding step comprises braiding said ferrometallic wires.

8. The method of forming reinforced thermoplastic hose comprising the steps of winding ferrometallic wires around a thermoplastic core tube in closely spaced windings to form a reinforced core tube wherein the windings form a reinforcement layer having minute spaces between said wires, heating said wire windings by passing said reinforced core tube through an induction heater, immediately after said heating, pressure extruding thermoplastic cover material over said reinforced core tube and through said spaces of the heated reinforcement wires with the cover material being extruded through said spaces to a depth exceeding the depth of any penetration of core tube material into said spaces, to form a composite hose structure, and cooling said composite hose structure to bond said cover material to said reinforcement wires to form an interlocking, integrated cover-reinforcement wire structure surrounding said core tube.

9. The method of claim 8 wherein said cover material has a flexural modulus less than the flexural modulus of said core tube material.

10. The method of claim 8 wherein said heating step further includes passing said reinforced core tube through a preheater in front of said induction heater.

11. The method set forth in claim 8 including internally supporting said core tube during said winding, heating and pressure extruding steps.

12. The method set forth in claim 8 wherein said cooling step comprises quenching said composite structure rapidly to cool said structure.

13. The method set forth in claim 8 wherein said cooling step includes passing cooling media through said core tube to substantially maintain the integrity of said core tube and confine bonding to the peripheral surface thereof.

14. The method set forth in claim 8 wherein said winding step comprising braiding said ferrometallic wires.

15. The method set forth in claim 8 wherein said winding step comprises winding said windings to form wire spirals wound in opposite directions.

16. The method set forth in claim 8 comprising the step of winding non-metallic reinforcement winding material around said core tube to form an inner reinforcement layer around which said ferrometallic wires are wound to form an outer reinforcement layer.

17. The method of claim 16 wherein said inner reinforcement layer is wound to provide 100% coverage of said core tube.

18. A method of forming reinforced thermoplastic hose comprising the steps of winding ferrometallic wires around a thermoplastic core tube in closely spaced windings to form a reinforced core tube wherein the windings form a reinforcement layer having minute spaces between said wires, heating said wire windings by passing said reinforced core tube through an induction heater, immediately after said heating, pressure extruding thermoplastic cover material over said reinforced core tube and through said spaces of the heated reinforcement wires with the cover material being extruded through said spaces to a depth exceeding the depth of any penetration of core tube material into said spaces, to form a composite hose structure, cooling said composite hose structure to bond said cover material to said reinforcement wires to form an interlocking, integrated cover-reinforcement wire structure surrounding said core tube, and winding non-metallic reinforcement winding material around said core tube to form an inner reinforcement layer around which said ferrometallic wires are wound to form an outer reinforcement layer, and wherein a separating layer is applied over said inner reinforcement layer and said ferrometallic wires are wound around said separating layer thereby to locate said separating layer between said inner and outer reinforcement layers.

19. The method set forth in claim 18 wherein the separating layer is a thermoplastic material.

20. The method set forth in claim 19 wherein said cover is bonded to said separating layer.

21. A method of forming reinforced thermoplastic hose comprising the steps of winding ferrometallic wires around a thermoplastic core tube in closely spaced windings to form a reinforced core tube wherein the windings form a reinforcement layer having minute spaces between said wires, heating said wire windings by passing said reinforced core tube through an induction heater, immediately after said heating, pressure extruding thermoplastic cover material over said reinforced core tube and through said spaces of the heated reinforcement wires with the cover material being extruded through said spaces to a depth exceeding the depth of any penetration of core tube material into said spaces, to form a composite hose structure, and cooling said composite hose structure to bond said cover material to said reinforcement wires to form an interlocking, integrated cover-reinforcement wire structure surrounding said core tube, and wherein said wire reinforcement layer is wound around a thermoplastic liner covering an inner wound wire reinforcement layer in turn covering a non-metallic fiber reinforcement layer wound around said core tube.

22. The method set forth in claim 21 wherein said non-metallic fiber layer is wound to provide 100% coverage of said core tube.

23. The method set forth in claim 22 wherein said non-metallic fiber layer is adhesively bonded to said core tube.

24. The method of claim 14, wherein said spaces are formed between crossing wires of the braided reinforcement layer.

* * * * *